United States Patent [19]

Tanaka

[11] Patent Number: 5,353,229
[45] Date of Patent: Oct. 4, 1994

[54] SYSTEM, UTILIZED IN SCHEDULING, OR THE LIKE, FOR SATISFYING CONSTRAINTS BY ALLOWING RELAXATION OF CONSTRAINTS

[75] Inventor: Toshikazu Tanaka, Toda, Japan

[73] Assignee: Kabushiki Kaisha Toshiba, Kawasaki, Japan

[21] Appl. No.: 969,074

[22] Filed: Oct. 30, 1992

[30] Foreign Application Priority Data

Dec. 26, 1991 [JP] Japan .................. 3-345141

[51] Int. Cl.⁵ ............................................ G06F 15/46
[52] U.S. Cl. .................. 364/468; 364/401; 364/402; 364/153
[58] Field of Search .......... 364/468, 153–156, 364/401–403; 395/55, 904, 926

[56] References Cited

U.S. PATENT DOCUMENTS

| | | |
|---|---|---|
| 3,987,281 | 10/1976 | Hodes . |
| 4,896,269 | 1/1990 | Tong .................. 364/468 |
| 5,053,970 | 10/1991 | Kurihara et al. . |
| 5,093,794 | 3/1992 | Howie et al. .......... 364/468 |
| 5,136,538 | 8/1992 | Karmarker et al. .... 364/402 |
| 5,212,791 | 5/1993 | Damian et al. ........ 364/468 |
| 5,216,593 | 1/1993 | Dietrich et al. ....... 364/402 |
| 5,276,775 | 1/1994 | Meng ................... 395/55 |

Primary Examiner—Jerry Smith
Assistant Examiner—Thomas E. Brown
Attorney, Agent, or Firm—Banner, Birch, McKie & Beckett

[57] ABSTRACT

In a system, utilized in, e.g., scheduling, for satisfying constraints by allowing relaxation of constraints, a constraint relaxation necessity detection section detects necessity of constraint relaxation in a problem solving cycle of a problem solving section. When the necessity of constraint relaxation is detected, a relaxation target constraint selection section is enabled to select a constraint to be relaxed from a constraint group. A constraint relaxation section searches a constraint relaxation knowledge management section in association with the selected constraint to check if a partial solution satisfies a relaxation permission condition. If the relaxation permission condition is satisfied, constraint relaxation is attempted according to a relaxation method recorded in correspondence with the relaxation permission condition. When the constraint relaxation is executed, the constraint relaxation necessity detection section checks if the constraint relaxation is successful, and the control returns to the problem solving cycle of the problem solving section.

4 Claims, 5 Drawing Sheets

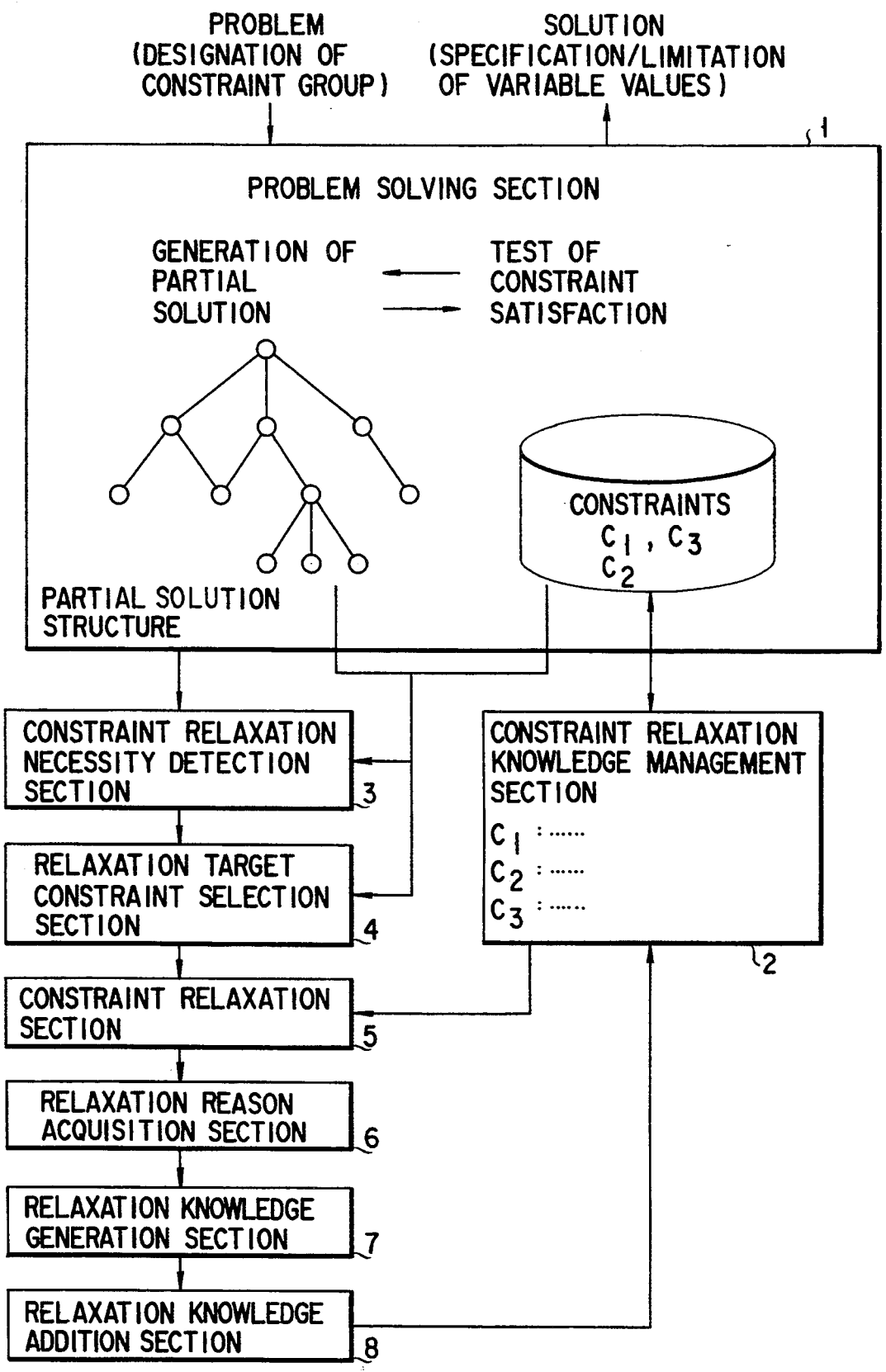
F I G. 1

SCHEDULE S3

| MACHINE NUMBER \ DATE | 1 | 2 | 3 | ------ 30 |
|---|---|---|---|---|
| M₁ | A | | ▨ | |
| M₂ | B | ▨ | | |
| M₃ | C | | | |

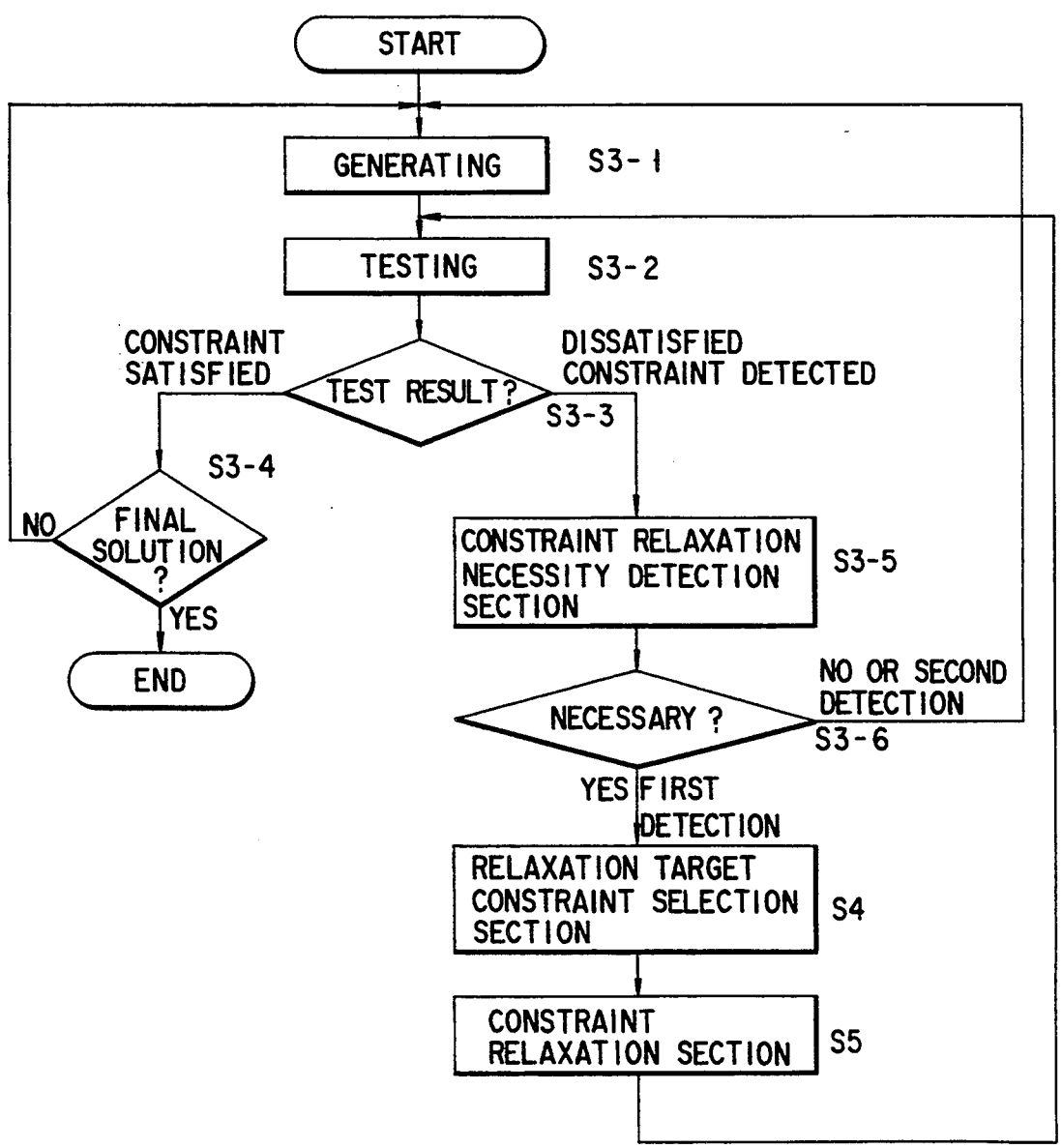
F I G. 3

SCHEDULE S4

| MACHINE NUMBER \ DATE | 1 | 2 | 3 | --------- 30 |
|---|---|---|---|---|
| $M_1$ | A |  | ///  |  |
| $M_2$ | B | /// |  |  |
| $M_3$ | C D |  |  |  |

FIG. 5

SCHEDULE S8

| MACHINE NUMBER \ DATE | 1 | 2 | 3 | --------- 30 |
|---|---|---|---|---|
| $M_1$ | A |  | /// |  |
| $M_2$ | B | /// | D |  |
| $M_3$ | C E |  |  |  |

FIG. 6

SCHEDULE S9

| MACHINE NUMBER \ DATE | 1 | 2 | 3 | --------- 30 |
|---|---|---|---|---|
| $M_1$ | A | F | /// |  |
| $M_2$ | B | /// | D |  |
| $M_3$ | C E |  |  |  |

FIG. 7

| MACHINE NUMBER \ DATE | 1 | 2 | 3 | ------- 30 |
|---|---|---|---|---|
| M₁ |  | A | F | ▨ |
| M₂ |  | B | ▨ | D |
| M₃ | C | E |  |  |

RELAX CONSTRAINT $C_1$ IN ABOVE SCHEDULE ?

(Y/N) → ___

F I G. 8

SYSTEM, UTILIZED IN SCHEDULING, OR THE LIKE, FOR SATISFYING CONSTRAINTS BY ALLOWING RELAXATION OF CONSTRAINTS

BACKGROUND OF THE INVENTION

1. Field of the Invention

The present invention relates to a system, which can relax constraints in, e.g., a scheduling system, a design assist system, an action planning system, and the like, and can specify or limit the values that variables can assume so that all the constraints are satisfied.

2. Description of the Related Art

In general, a constraint satisfaction system for specifying or limiting the values that variables can assume to satisfy constraints upon planning of some given schedules suffers from the following technical difficulty. That is, when a solution that satisfies all the constraints is to be obtained, some constraints are often too strict for the system to obtain such a solution. Even if a solution that satisfies all the constraints is present, in some cases, a set of final solutions to be searched are extremely limited, and a vast space candidate solutions must be searched. As a result, a long calculation time is required.

Some of these constraints need not always be strictly satisfied according to conditions. For example, in a production scheduling problem, although constraints associated with the way of use of production machines are often given, the way of use of machines is normally flexible to some extent, and can be changed more or less depending on conditions. In this manner, in an actual constraint satisfaction problem, constraints can be relaxed to widen a "solution space" or "a set of candidate solutions".

As an early technique for solving a constraint satisfaction problem, an approach based on the operations research (to be referred to as the "OR" hereinafter) has been popular.

In the approach based on the OR, constraints are "formulated" by mathematical programming represented by linear programming or integer programming. In the method using the mathematical programming, constraints must be fixed upon formulation, and cannot be changed in a process of obtaining a solution. Although an optimal solution can be obtained, the types of constraints are limited. For example, in the linear programming, constraints must be expressed in the forms of equations and inequalities of linear combinations of variables. In the integer programming, variables themselves must be integers. Therefore, the approach based on the OR is not always best suited for general "Constraint Satisfaction Problems" (normally abbreviated to as a CAP), except for "problems for which constraints are accurately described, and which require a strict optimal solution".

An approach based on an expert system adopting an artificial intelligence (to be referred to as AI hereinafter) technique is introduced for the purpose of compensating for the drawbacks of the approach based on OR. In the approach based on AI, a generate-and-test method for repeating "generation of a candidate solution" and "check of constraint satisfaction" on the basis of the search in the space of possible solutions is the mainstream. This method is suitable for constraint satisfaction problems since "solutions that satisfy constraints can be obtained without obtaining an optimal solution". "Constraints" are acquired from experts of the corresponding fields upon construction of the system (called knowledge acquisition), and are built in a knowledge base.

In the constraint satisfaction system based on the expert system, attempts have been made to flexibly cope with constraint relaxation. For example, in a certain system, constraints are classified into some classes according to their possibility of relaxation. When the necessity of constraint relaxation occurs, relaxation is performed from constraints in the relaxation possible class. However, in this system, whether or not constraint relaxation is possible must be decided upon construction of the system, and such knowledge must be acquired from the experts of the corresponding fields. In addition, the expert must present this decision knowledge while assuming "situations in which constraints are violated", and correct knowledge about possibility of relaxation cannot always be obtained. Even when constraint relaxation information becomes necessary during solving of a constraint satisfaction problem, it cannot be dynamically added.

SUMMARY OF THE INVENTION

The present invention has been made in consideration of the above situation, and has as its object to provide a system, utilized in, e.g., scheduling, for satisfying constraints (a constraint group hereinafter) by allowing relaxation of constraints, which can acquire information about possibility of relaxation of constraints, and a method and degree of relaxation from a proper knowledge source, and can adequately, accurately, and efficiently perform constraint relaxation on the basis of correct knowledge based on concrete conditions.

In order to achieve the above object, according to the present invention, a system, utilized in, e.g., scheduling, for satisfying constraints by allowing relaxation of constraints, comprises:

means for obtaining a final solution which specifies values that all variables can assume to satisfy by repeating a problem solving cycle consisting of generation of a partial solution which refines values that some or all constraints of a constraint group can assume, and a test of checking whether or not the generated solution satisfies each of the constraints;

constraint relaxation necessity detection means for detecting necessity of relaxation of some constraints during execution of the problem solving cycle;

constraint relaxation knowledge management means for managing stored information associated with possibility of relaxation and a method of relaxation, and a procedure to be enabled to know a relaxation condition from an external source in correspondence with each of the constraints;

relaxation target constraint selection means for, when the constraint relaxation necessity detection means detects the necessity of relaxation of some constraint, selecting a constraint to be relaxed from the constraint group; and constraint relaxation means for checking possibility of relaxation of the constraint selected by the relaxation target constraint selection means upon reception of information stored in the constraint relaxation knowledge management means, and for, when it is determined that relaxation is possible, executing relaxation of the constraint.

With the above arrangement, the system, utilized in, e.g., scheduling, for satisfying constraints by relaxing constraints, according to the present invention, can acquire possibility of relaxation of constraints, and a method and degree of relaxation from a proper knowledge source when constraints are required to be relaxed, and can adequately, accurately, and efficiently perform constraint relaxation on the basis of correct knowledge based on concrete conditions. When it cannot be clearly determined whether or not relaxation of a specific constraint is possible, new constraint relaxation knowledge is acquired by an inquiry to an external source, and can be added to the management means. For this reason, the inquiry frequency of possibility of relaxation of constraints, and a method and degree of relaxation can be lowered.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a schematic diagram showing an arrangement of a system according to the present invention;

FIG. 3 is a flow chart for explaining an approach based on a detection result of a constraint relaxation necessity detection means (FIG. 1) and the generate-and-test method;

FIG. 5 shows a schedule table showing a partial schedule when a relaxation impossible constraint is violated;

FIG. 6 shows a schedule table showing a partial schedule when a relaxation possible constraint is violated;

FIG. 7 shows a schedule table showing a partial schedule when a constraint whose relaxation possibility cannot be decided is violated; and FIG. 8 is a view showing a case wherein possibility of relaxation of a constraint is inquired to an external source on a display screen.

DETAILED DESCRIPTION OF THE PREFERRED EMBODIMENTS

Figures 2, 4:
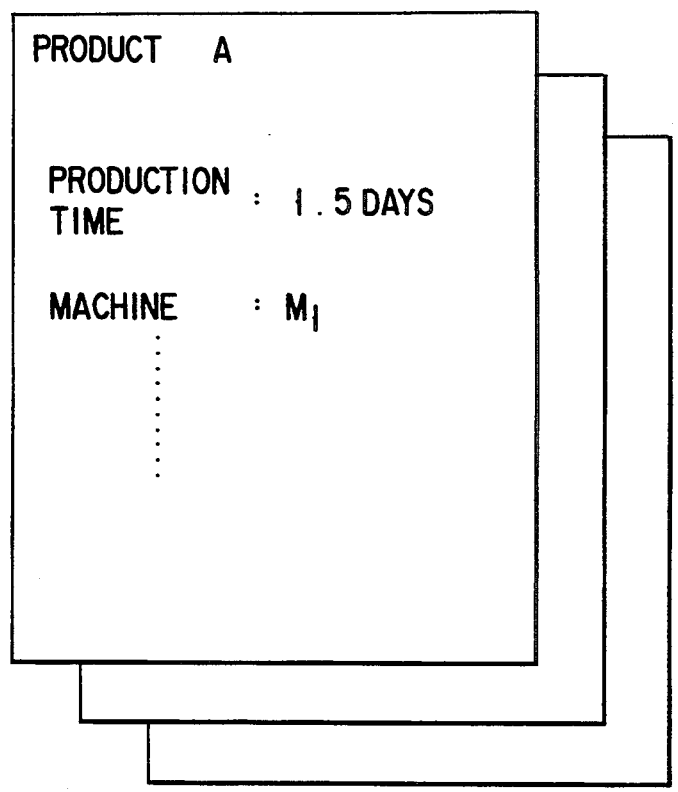
FIG. 2 is a view showing an example of a request list for designating a set of constraints in addition to a predetermined constraint group.
FIG. 4 shows a schedule table showing a partial schedule satisfying all the constraints.

An embodiment of a system for satisfying constraints according to the present invention will be described below with reference to FIGS. 1 to 8. In this embodiment, the present invention is applied to a production scheduling system.

FIG. 1 is a diagram showing an arrangement of a production scheduling system according to the embodiment of the present invention. In FIG. 1, reference numeral 1 denotes a problem solving section. The problem solving section 1 repeats a cycle including generation of a partial solution and a test of checking if a partial solution satisfies a constraint so as to satisfy each of the given constraints $C_1$, $C_2$, $C_3$, ... until "a proper solution is found" or until "it is determined that no solution is present". In this embodiments, constraints $C_1$, $C_2$, and $C_3$ are as follows:

$C_1$: Do not produce a product F after a product A in a machine $M_1$.

$C_2$: Do not produce a product E after a product C in a machine $M_3$.

$C_3$: Total power consumption of the entire factory at each given time must not exceed 500 kW.

In this embodiment, the input of a "scheduling problem" (designation of a constraint group) is made in the form of a "list of production requests" in units of products, as shown in FIG. 2. Each production request is designated with a product name, a production time (duration necessary for production), a production machine to be able to be used, and the like. A "partial solution" is expressed as a "production schedule" of a product given as the input. The production schedule of each product designates a name of a machine to be used, a start time, and an end time.

The problem solving section i selects a machine which can start production earliest, and does not reach its rest period during a production period from machines that can produce a given product for a "production request" arbitrarily selected from the list of production requests, and assigns a schedule to the selected machine.

In FIG. 1, sections 2 to 8 are associated with a constraint relaxation function. More specifically, reference numeral 2 denotes a constraint relaxation knowledge management section; 3, a constraint relaxation necessity detection section; 4, a relaxation target constraint selection section; 5, a constraint relaxation section; 6, a constraint relaxation reason acquisition section; 7, a relaxation knowledge generation section; and 8, a relaxation knowledge addition section.

The constraint relaxation necessity detection section 3 monitors the problem solving cycle in the problem solving section 1, and detects whether or not necessity of constraint relaxation occurs in the problem solving cycle. When the constraint relaxation necessity detection section 3 detects the necessity of constraint relaxation, the relaxation target constraint selection section 4 is enabled to select a constraint to be relaxed from the constraint group stored in the problem solving section 1.

The constraint relaxation section 5 searches the constraint relaxation knowledge management section 2 in association with the selected constraint to check if the partial solution satisfies the relaxation permission condition. If the relaxation permission condition is satisfied, constraint relaxation is attempted according to a relaxation method recorded in correspondence with the relaxation permission condition. When a relaxation rejection condition is recorded in the constraint, it is then checked if the partial solution corresponds to the relaxation rejection condition. If the partial solution corresponds to the relaxation rejection condition, the partial solution is rejected.

When the constraint relaxation is executed, the constraint relaxation necessity detection section 3 checks if the constraint relaxation is successful. If the constraint relaxation is successful, the partial solution will be refined in the hope that it leads to a final solution. Then, the control returns to the problem solving cycle of the problem solving section 1. On the other hand, if the constraint relaxation is unsuccessful, the partial solution is rejected as an infeasible partial solution. Then, the control returns to the problem solving cycle of the problem solving section 1.

The details of the above-mentioned operation will be described below with reference to the flow chart shown in FIG. 3.

FIG. 3 shows a problem solution flow based on the generation-and-test method for repeating generation of a solution candidate, and a test of checking if a solution satisfies each of the constraints. A test result is checked (S3-3) following the generating step (S3-1) and the testing step (S3-2). More specifically, when the generated partial solution satisfies each of the constraints, or when there is no violation with any constraint, it is then checked if the partial solution is a final solution (S3-4). If YES in step S3-4, problem solving is ended. However, if NO in step S3-4, the flow returns to the generating step (S3-1), and a partial solution following the above partial solution is generated and tested, thus executing the problem solving cycle.

If it is determined in the step (S3-3) of checking the test result that there is a constraint that cannot be satisfied by the test result, the constraint relaxation necessity detection section (S3-5) checks the necessity of constraint relaxation under a judgment that the partial solution cannot satisfy the constraint (S3-6). If the necessity of constraint relaxation is detected in step S3-6, and if such detection is made for the first time, the relaxation target constraint selection section 4 selects a constraint to be relaxed from the constraint group stored in the problem solving section 1. The constraint relaxation section 5 checks if a partial solution as the selected constraint satisfies a relaxation permission condition. The checking result is fed back to and tested in the testing step (S3-2), and an attempt is made to refine the partial solution again. If no necessity of relaxation is detected in step S3-6, or if the detection of the necessity of relaxation is made for the second time, the flow returns to the generating step (S3-1) for generating a partial solution as another candidate, i.e., a so-called back track operation is performed. Only when no necessity of relaxation is detected in re-testing, it is determined that constraint relaxation is successful.

Referring back to FIG. 1, when it cannot be clearly determined whether or not relaxation of a specific constraint is possible, the constraint relaxation section 5 inquires possibility of relaxation to a source outside the system. When relaxation permission and a method of relaxation are answered, constraint relaxation is attempted as described above. Regardless of whether the constraint relaxation is either successful or unsuccessful, the control returns to the problem solving cycle of the problem solving section 1.

When the possibility of relaxation is inquired to the source outside the system, the relaxation reason acquisition section 6 acquires a relaxation reason in addition to the constraint relaxation possibility information. The relaxation knowledge generation section 7 analyzes the acquired relaxation possibility information, relaxation method, and permission reason, and generates a set of a relaxation permission condition and a relaxation method. The relaxation knowledge addition section 8 adds these pieces of information to the constraint relaxation knowledge management section 2. Thereafter, the control returns to the problem solving cycle of the problem solving section 1.

The constraint satisfaction system as a whole repeats the above-mentioned cycle. When a "final solution" that satisfies all given constraints or relaxed constraints is obtained (successful), or when all the exclusive partial solutions have been explored (unsuccessful), processing is ended.

The constraint relaxation function will be described in detail below with reference to schedule tables shown in FIGS. 4 to 7.

The constraint relaxation necessity detection section 3 in FIG. 1 compares the state of an incomplete schedule table with constraints to confirm constraint satisfaction, and determines necessity of constraint relaxation if at least one constraint is not satisfied. More specifically, assume that the production request of a product C is scheduled after products A and B to generate a "partial schedule $S_3$", as shown in, e.g., a schedule table of FIG. 4. Assuming that the partial schedule $S_3$ satisfies all the above-mentioned constraints $C_1$, $C_2$, and $C_3$, the constraint relaxation necessity detection means 3 determines that partial solutions corresponding to the schedule table shown in FIG. 4 are acceptable. In FIG. 4, a hatched portion indicates a rest state for inspection of the machine. The same applies to FIGS. 5 to 7.

Assume that a partial schedule $S_4$ shown in FIG. 5 is generated in a search process. In the partial schedule $S_4$, assume that the above-mentioned constraint $C_3$ is not satisfied. The constraint relaxation necessity detection section 3 obtains information about this from the problem solving section 1, and determines that constraint relaxation is necessary. The relaxation target constraint selection section 4 and the constraint relaxation section 5 are enabled. Firstly, the relaxation target constraint selection section 4 selects the constraint $C_3$ as a relaxation target and then, the constraint relaxation section 5 checks possibility of relaxation of the constraint $C_3$ by searching the constraint relaxation knowledge management section 2.

The constraint relaxation knowledge management section 2 stores the following pieces of relaxation information $R_1$, $R_2$, and $R_3$ corresponding to the constraints $C_1$, $C_2$, and $C_3$:

$R_1$: Relaxation depends on the result of an inquiry to an equipment department.

$R_2$: Relaxation is possible only once at the beginning of a month.

$R_3$: Relaxation is always impossible.

Based on these pieces of relaxation information, it is determined that relaxation of the constraint $C_3$ is impossible under any condition. Therefore, it is determined that relaxation of the constraint $C_3$ is impossible in the schedule $S_4$, and the schedule $S_4$ is rejected as an infeasible schedule.

A case will be described below wherein a relaxation possible constraint is violated. Assume that a partial schedule $S_8$ shown in FIG. 6 is generated in the search process. In the schedule $S_8$, the problem solving section 1 detects in constraint testing that the constraint $C_2$ is not satisfied, and the constraint relaxation necessity detection section 3 detects necessity of constraint relaxation. The relaxation target constraint selection section 4 and the constraint relaxation section 5 are enabled. Firstly, the relaxation target constraint selection section 4 selects the constraint $C_2$ as a relaxation target and then, the constraint relaxation section 5 checks possibility of relaxation of the constraint $C_2$ by searching the constraint relaxation knowledge management section 2. Based on the relaxation information $R_2$, since the constraint $C_2$ can be relaxed at the beginning of a month, the state $S_8$ is acceptable if it is at the beginning of a month.

The operation of the system when it cannot be determined whether or not constraint relaxation is possible will be described in detail below. Assume that a partial schedule $S_9$ shown in FIG. 7 is generated in the search process. In the schedule $S_9$, the product F is produced after the product A in the machine $M_1$. The problem solving section 1 detects in constraint testing that the constraint $C_1$ is not satisfied, and the constraint relaxation necessity detection section 3 detects necessity of constraint relaxation. The relaxation target constraint selection section 4 and the constraint relaxation section 5 are enabled. Firstly, the relaxation target constraint selection section 4 selects the constraint $C_1$ as a relaxation target and then, the constraint relaxation section 5 checks possibility of relaxation of the constraint $C_1$ by searching the constraint relaxation knowledge management section 2.

Whether or not the constraint $C_1$ is relaxed cannot be determined by only the system since the relaxation information $R_1$ stored in correspondence with the constraint $C_1$ states that "relaxation depends on the result of an inquiry to an equipment department". For this reason, the constraint relaxation section 5 inquires to the external source (in this case, the equipment department) whether or not the constraint $C_1$ can be relaxed. This inquiry is carried out by making a display shown in, e.g., FIG. 8 on a personal computer of the corresponding department so as to communicate with a person who controls management.

This constraint $C_1$ is one imposed based on the requirement from the department for maintaining the machine $M_1$. Assume that, as a result of the communication with the person who controls management on the personal computer of the corresponding department, as shown in FIG. 8, constraint relaxation is permitted such that "although this constraint is introduced for the purpose of reducing the load on the machine $M_1$, the machine $M_1$ may be loaded to some extent since the limit value (e.g., 5 days) of the continuous operation is not exceeded, and a periodic maintenance will come soon". Then, constraint relaxation is performed, as described above.

When the possibility of constraint relaxation is inquired to the external source, in this embodiment, the relaxation reason acquisition section 6 urges the person who controls management to input the above-mentioned constraint relaxation reason, and acquires the information. The relaxation knowledge generation section 7 analyzes and generalizes the input reason to generate a constraint relaxation permission condition "the constraint $C_1$ associated with the continuous operation of the machine can be neglected immediately before the periodic maintenance as long as the limit value (5 days) of the continuous operation of the machine $M_1$ is not exceeded", and a constraint relaxation method (negligence of the constraint). These pieces of information are added to the constraint relaxation knowledge management section 2 by the relaxation knowledge addition section 8.

In this manner, according to this embodiment, when constraint relaxation is necessary, possibility of constraint relaxation, and a method and degree of relaxation can be acquired from a proper knowledge source, and the constraint relaxation can be adequately, accurately, and efficiently performed on the basis of correct knowledge based on concrete conditions. Since new constraint relaxation knowledge is acquired and added by an inquiry, the inquiry frequency of the possibility, method, and degree of constraint relaxation can be lowered.

What is claimed is:

1. A system, utilized in scheduling, for satisfying constraints by allowing relaxation of constraints, comprising:

means for obtaining a final solution which specifies values that all variables can assume by repeating a problem solving cycle consisting of generation of a partial solution which refines values that some or all constraints of a constraint group can assume, and a test of checking whether or not the generated solution satisfies each of the constraints;

constraint relaxation necessity detection means for detecting necessity of relaxation of some constraints during execution of the problem solving cycle;

constraint relaxation knowledge management means for managing stored information associated with a possibility of relaxation and a method of relaxation, and a procedure to be enabled to know a relaxation condition from an external source in correspondence with each of the constraints;

relaxation target constraint selection means for, when said constraint relaxation necessity detection means detects the necessity of relaxation of some constraint, selecting a constraint to be relaxed from the constraint group; and constraint relaxation means for checking the possibility of relaxation of the constraint selected by said relaxation target constraint selection means upon reception of information stored in said constraint relaxation knowledge management means, and for, when it is determined that relaxation is possible, executing relaxation of the constraint.

2. A system, utilized in scheduling, for satisfying constraints by allowing relaxation of constraints, comprising:

means for obtaining a final solution which specifies values that all variables can assume by repeating a problem solving cycle consisting of generation of a partial solution which refines values that some or all constraints of a constraint group can assume, and a test of checking whether or not the generated solution satisfies each of the constraints;

constraint relaxation necessity detection means for detecting necessity of relaxation of some constraint during execution of the problem solving cycle;

constraint relaxation knowledge management means for managing stored information associated with a possibility of relaxation and a method of relaxation, and a procedure to be enabled to know a relaxation condition from an external source in correspondence with each of the constraints;

relaxation target constraint selection means for, when said constraint relaxation necessity detection means detects the necessity of relaxation of some constraint, selecting a constraint to be relaxed from the constraint group;

constraint relaxation means for checking the possibility of relaxation of the constraint selected by said relaxation target constraint selection means upon reception of information stored in said constraint relaxation knowledge management means, and for, when it is determined that relaxation is possible, executing relaxation of the constraint;

relaxation reason acquisition means for, when said constraint relaxation means executes the procedure according to the information associated with the procedure to be enabled to know a relaxation condition from the external source, which information is stored in said constraint relaxation knowledge management means, and knows the relaxation condition from the external source, acquiring a relaxation reason;

relaxation knowledge generation means for analyzing the relaxation reason input from said relaxation reason acquisition means, and generating a determination condition for determining possibility of relaxation of a constraint and a relaxation method; and relaxation knowledge addition means for adding the determination condition information and the relaxation method information generated by said relaxation knowledge generation means to said constraint relaxation knowledge management means.

3. A system according to claim 1, wherein the possibility of relaxation comprises a relaxation permission condition corresponding to each constraint, and wherein said constraint relaxation means searches said constraint relaxation knowledge management means to check if the partial solution satisfies the relaxation permission condition corresponding to the selected constraint.

4. A system according to claim 3, wherein said constraint relaxation means executes relaxation of the selected constraint according to a method of relaxation corresponding to the relaxation permission condition.

* * * * *